United States Patent [19]

Kishi et al.

[11] Patent Number: 5,006,955
[45] Date of Patent: Apr. 9, 1991

[54] SOLID DIELECTRIC CAPACITOR AND METHOD OF MANUFACTURE

[75] Inventors: Hiroshi Kishi, Fujioka; Hirokazu Chazono, Takasaki; Minoru Oshio; Hiroshi Saito, both of Haruna; Toshiya Nakamura; Hisamitsu Shizuno, both of Takasaki, all of Japan

[73] Assignee: Taiyo Yuden Co., Ltd., Tokyo, Japan

[21] Appl. No.: 482,658

[22] Filed: Feb. 21, 1990

[30] Foreign Application Priority Data

Feb. 28, 1989 [JP] Japan .................................. 1-48871

[51] Int. Cl.$^5$ .................. C04B 35/46; H01G 4/12; H01G 4/10
[52] U.S. Cl. ................................ 361/321; 264/65; 501/137
[58] Field of Search ............................ 361/320, 321; 501/136–138; 264/61, 65

[56] References Cited

U.S. PATENT DOCUMENTS

| | | | |
|---|---|---|---|
| 4,610,968 | 9/1986 | Wada et al. | 501/137 |
| 4,610,969 | 9/1986 | Wada et al. | 501/137 |
| 4,610,970 | 9/1986 | Wada et al. | 501/137 |
| 4,610,971 | 9/1986 | Wada et al. | 501/135 |
| 4,809,130 | 2/1989 | Chazono et al. | 264/61 |

Primary Examiner—Donald A. Griffin
Attorney, Agent, or Firm—Woodcock Washburn Kurtz Mackiewicz & Norris

[57] ABSTRACT

A monolithic capacitor having a dielectric ceramic body cosintered with at least two base metal electrodes. The ceramic body is composed of a major ingredient expressed by the formula, $$(1-\alpha)\{(Ba_{k-x}M_x)O_kTiO_2\}+\alpha CaZrO_3$$

where M is either or both of calcium and strontium, and $\alpha$, $k$ and $y$ are numerals in specified ranges. To this major ingredient is added a minor proportion of a mixture of lithium oxide, silicon dioxide and at least one metal oxide selected from among barium oxide, strontium oxide, calcium oxide, magnesium oxide and zinc oxide. For the fabrication of capacitors the mixture of the above major ingredients and additives in finely divided form are formed into moldings of desired shape and size, each with at least two electrodes buried therein. The moldings and electrodes are cosintered in a reductive or neutral atmosphere at temperatures of less than 1200° C. and then are reheated at a lower temperature in an oxidative atmosphere.

9 Claims, 1 Drawing Sheet

SOLID DIELECTRIC CAPACITOR AND METHOD OF MANUFACTURE

BACKGROUND OF THE INVENTION

Our invention relates to solid dielectric capacitors and more particularly to a monolithic ceramic capacitor comprising a single or multiple layered ceramic body and at lest two electrodes in contact therewith. The invention also pertains to a method of fabricating such capacitors.

Multilayered ceramic capacitors have long been known and used extensively which employ noble metals such as platinum and palladium as the electrode materials. Generally, for the fabrication of such capacitors, "green" (unsintered) dielectric sheets have first been prepared from the proportioned ingredients of a desired dielectric ceramic material in finely divided form. An electroconductive paste containing powdered platinum or palladium has then been "printed" on the green sheets in a desired pattern. Then a plurality of such printed green sheets have been stacked up, pressed together, and sintered in a temperature range of 1300° to 1600° C. in an oxidative atmosphere.

This conventional method makes possible the simultaneous firing (cosintering) of the dielectric ceramic layers and the film electrodes interleaved therewith. It is also an acknowledged advantage of this known method that the noble metal electrodes are totally unaffected by the high temperature sintering in an oxidative atmosphere. Offsetting all such advantages is the expensiveness of the noble metals, which add substantially to the manufacturing costs of the multilayered ceramic capacitors.

Wada et al. U.S. Pat. No. 4,610,969, assigned to the assignee of the instant application, suggests a solution to the above problem. It teaches dielectric ceramic compositions consisting of a major ingredient expressed by the formula, $(Ba_{k-x}M_x)O_kTiO_2$, where M is at least either of magnesium (Mg) and zinc (Zn), and additives consisting of lithium oxide ($Li_2O$) and silicon dioxide ($SiO_2$). The compositions may, or may not, additionally include at least one metal oxide selected from among barium oxide (BaO), calcium oxide (CaO) and strontium oxide (SrO).

Another solution is found in Wada et al. U.S. Pat. No. 4,610,970, which proposes ceramic compositions whose major ingredient is expressed by the formula, $(Ba_{k-x-y}M_xL_y)O_kTiO_2$, where M is at least either of Mg and Zn, and L is at least either of Sr and Ca. To this major ingredient are added $Li_2O$, $SiO_2$, and, optionally, at least one other metal oxide selected from among BaO, CaO and SrO.

Wada et al. U.S. Pat. No. 4,610,971 suggests still another solution, teaching use of a major ingredient expressed by the formula, $(Ba_{k-x}M_x)O_kTiO_2$, where M is at least one of Mg, Zn, Sr and Ca. This major ingredient is admixed with boric oxide ($B_2O_3$), $SiO_2$ and, optionally, at least one other metal oxide selected from among BaO, MgO, ZnO, SrO and CaO.

A further solution is found in Wada et al. U.S. Pat. No. 4,610,968, which proposes ceramic compositions including a major ingredient expressed by the formula, $(Ba_{k-x}M_x)O_kTiO_2$, where M is at least one of Mg, Zn, Sr and Ca. This major ingredient is admixed with $B_2O_3$ and at least one metal oxide selected from among BaO, MgO, ZnO, SrO and CaO.

All the foregoing known compositions make possible the fabrication of ceramic bodies by firing at temperature of not more than 1200° C. in a nonoxidative (reductive or neutral) atmosphere. The ceramic bodies may therefore be cosintered with electrodes of a base metal such as nickel. The resulting capacitors have specific dielectric constants of not less than 2000, and the temperature dependences of their capacitances are within plus or minus 10 percent in a temperature range of −25° to +85° C.

While these values are satisfactory for all practical purposes, we have nevertheless been hard pressed by our customers, with the recent development of microelectronics, for ceramic capacitors that have higher specific dielectric constants with no less temperature dependences.

SUMMARY OF THE INVENTION

We have hereby invented how to manufacture ceramic capacitors that have higher dielectric constants, with less temperature dependences over a wide temperature range, than heretofore and which can be formed by firing in a temperature range of not more than 1200° C. in a nonoxidative atmosphere.

Briefly stated in one aspect thereof, our invention provides a solid dielectric capacitor of the above improved characteristics, comprising a low temperature sintered dielectric ceramic body and at least two electrodes in contact therewith. The ceramic body consists essentially of 100 parts by weight of a major ingredient that is expressed by the formula, $(1-\alpha)\{(Ba_{k-x}M_x)O_k\cdot TiO_2\}+\alpha CaZrO_3$, and 0.2 to 5.0 parts by weight of an additive mixture of $Li_2O$, $SiO_2$ and at least one of BaO, SrO, CaO, MgO and ZnO. In the formula of the major ingredient, M is at least one of calcium and strontium, $\alpha$ is a numeral in the range of 0.005 to 0.040, K is a numeral in the range of 1.00 to 1.05, and x is a numeral in the range of 0.01 to 0.05. The relative proportions of $Li_2O$, $SiO_2$ and at least one selected metal oxide, altogether constituting the additive mixture, will be specified with reference to he ternary diagram attached hereto.

Another aspect of our invention concerns a method of fabricating the ceramic capacitor having the ceramic body of the above specified composition. The method dictates, first of all, the preparation of a mixture of the above specified major ingredient and additives in finely divided form. This mixture is then molded into a body of desired shape and size, which is provided with at least two electrode portions of an electroconductive material in any convenient manner. Then the moldings with the electrode portions are cosintered in a reductive or neutral atmosphere and is subsequently reheated in an oxidative atmosphere.

The dielectric ceramic composition of our invention, set forth in the foregoing, makes it possible to sinter the moldings in a nonoxidative atmosphere at temperatures not exceeding 1200° C. A preferred temperature range for this molding operation is form 1050° to 1200° c. The sintering temperatures of less than 1200° C. enable the use of nickel or like low cost base metal as the electrode material in cosintering the ceramic boy and the electrodes.

Therefore, in the fabrication of ceramic capacitors by the method of our invention, an electroconductive paste of powdered nickel or like base metal may be printed, coated, or otherwise formed on green sheets of the dielectric ceramic compositions in accordance with our invention. The green sheets and the electroconductive layers thereon may be cosintered at temperatures of not more than 1200° C.

The ceramic capacitors of our invention have proved to have very favorable physical and performance characteristics. The test capacitors manufactured in accordance with our invention, to be disclosed subsequently, had specific dielectric constants of more than 3000, dielectric losses of not more than 2.5%, and resistivities of not less than $1 \times 10^6$ megohm-centimeters. Also the temperature dependences of their specific dielectric constants were from $-15\%$ to $+15\%$ of the value at 25° C. in a temperature range of $-55°$ to $+125°$ C., and from $-10\%$ to $+10\%$ of the value at 20° C. in a temperature range of $-25°$ to $+85°$ C.

The above and other features and advantages of our invention and the manner of realizing them will become more apparent, and the invention itself will best be understood, from a study of the following description and appended claims taken together with the attached drawings.

DETAILED DESCRIPTION

Figure 1:
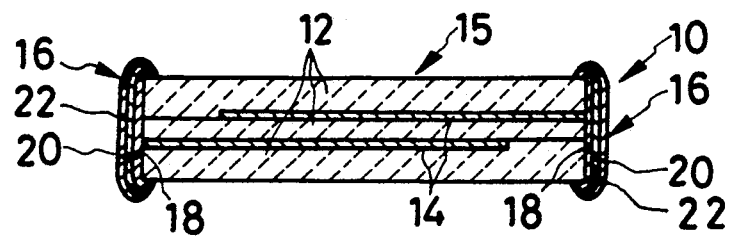
FIG. 1 is a section through a monolithic, multilayered ceramic capacitor capable of fabrication in accordance with the teachings of our invention, the illustrated capacitor being representative of numerous test capacitors manufactured in the Examples of our invention to be presented subsequently.

We have illustrated in FIG. 1 one of many monolithic ceramic capacitors of like construction fabricated in the subsequent Examples of our invention by way of a preferable embodiment thereof. Generally designated 10, the representative capacitor is shown to have an interlamination of three dielectric ceramic layers 12 and two film electrodes 14. The three ceramic layers 12 constitute in combination a solid dielectric body 15 having the low temperature sinterable ceramic compositions in accordance with our invention. The two film electrodes 14, which can be of a low cost base metal such as nickel, extend from both sides of the dielectric body 15 toward, the terminate short of, the opposite sides of the dielectric body and so have an overlapping, parallel spaced relation to each other.

The capacitor 10 also includes a pair of conductive terminations 16 which are formed on both sides of the dielectric body 15 and which contact the respective film electrodes 14. Each termination 16 is shown to comprise a baked on zinc layer 18, a plated on copper layer 20, and a plated on solder layer 22.

Typically, and as fabricated in the subsequent Examples of our invention, the intermediate one of the three dielectric layers 12 has a thickness of 0.02 millimeter (mm). The area of that part of each film electrode 14 which overlaps the other film electrode is 25 mm$^2$ (5 × 5 mm).

EXAMPLES

We fabricated 75 different sets of test capacitors, each constructed as shown in FIG. 1, some having their dielectric bodies formulated in accordance with the ceramic compositions of our invention and others not. Then we measured the specific dielectric constant, dielectric loss, resistivity, and temperature dependence of capacitance of the test capacitors. Table 1 lists the compositions of the dielectric bodies of all the test capacitors fabricated.

We have previously defined the major ingredient of the ceramic compositions in accordance with our invention by the general formula, $(1-\alpha)\{(Ba_{k-x}M_x)O_kTiO_2\}+\alpha(CaZrO_3)$. Thus, in Table 1, we have given various combination of $(1-\alpha)$, $\alpha(k-x)$, x and k in the formula to indicate the specific major ingredients employed in the various Tests. The $(1-\alpha)$ and $\alpha$ indicate the relative proportions of $(Ba_{k-x}M_x)O_kTiO_2$ and $CaZrO_3$ of the major ingredient in moles. The $(k-x)$, x and k indicate the atomic numbers of the associated elements when the atomic number of Ti is one. Since M can be either or both of Ca and Sr, the column under x is subdivided into he atomic numbers of these elements and their sum (x).

The ceramic compositions of our invention also includes a mixture of the additives Li$_2$O, SiO$_2$ and MO in various proportions. Table 1 specifies the amounts, in parts by weight, of the additive mixture with respect to 100 parts by weight of the major ingredient, as well as the relative proportions, in mole percent, of the additives Li$_2$O, SiO$_2$ and MO. Further, since MO can be any one or more of BaO, MgO, ZnO, SrO and CaO, Table 1 gives the relative proportions, in mole percent, of these metal oxides.

TABLE 1

| | Ceramic Compositions | | | | | | | | | | | | | | | |
|---|---|---|---|---|---|---|---|---|---|---|---|---|---|---|---|---|
| | Ingredient (100 wt. parts) | | | | | | | | Additives | | | | | | | |
| | | | | | | | | | | Composition (mole %) | | | MO (mole %) | | | | |
| Test No. | 1 − α | α | k − x | Ca | Sr | x Sum | k | Amount (wt. part) | Li$_2$O | SiO$_2$ | MO | BaO | SrO | CaO | MgO | ZnO |
| 1 | 0.98 | 0.02 | 0.99 | 0.03 | — | 0.03 | 1.02 | 2.0 | 1 | 80 | 19 | 20 | — | 50 | 30 | — |
| 2 | " | " | " | " | — | " | " | " | 1 | 39 | 60 | " | — | " | " | — |
| 3 | " | " | " | " | — | " | " | " | 30 | 30 | 40 | " | — | " | " | — |
| 4 | " | " | " | " | — | " | " | " | 50 | 50 | — | — | — | — | — | — |
| 5 | " | " | " | " | — | " | " | " | 20 | 80 | — | — | — | — | — | — |
| 6 | " | " | " | " | — | " | " | " | 10 | 50 | 40 | 20 | — | 50 | 30 | — |
| 7 | " | " | " | " | — | " | " | " | 30 | 40 | 30 | " | — | " | " | — |
| 8 | " | " | " | " | — | " | " | " | 20 | 60 | 20 | " | — | " | " | — |
| 9 | " | " | " | " | — | " | " | " | 35 | 65 | — | — | — | — | — | — |
| 10 | " | " | " | " | — | " | " | " | 1 | 59 | 40 | 20 | — | 50 | 30 | — |
| 11 | 0.98 | 0.02 | 0.99 | 0.03 | — | 0.03 | 1.02 | 2.0 | 1 | 85 | 14 | 20 | — | 50 | 30 | — |
| 12 | " | " | " | " | — | " | " | " | 1 | 29 | 70 | " | — | " | " | — |
| 13 | " | " | " | " | — | " | " | " | 20 | 30 | 50 | " | — | " | " | — |
| 14 | " | " | " | " | — | " | " | " | 50 | 30 | 20 | " | — | " | " | — |
| 15 | " | " | " | " | — | " | " | " | 60 | 40 | — | — | — | — | — | — |

TABLE 1-continued

Ceramic Compositions

| Test No. | Ingredient (100 wt. parts) 1 − α | α | k − x | x Ca | x Sr | x Sum | k | Additives Amount (wt. part) | Composition (mole %) Li2O | SiO2 | MO | MO (mole %) BaO | SrO | CaO | MgO | ZnO |
|---|---|---|---|---|---|---|---|---|---|---|---|---|---|---|---|---|
| 16 | " | " | " | " | — | " | " | " | 10 | 90 | — | — | — | — | — | — |
| 17 | " | " | " | " | — | " | " | " | 20 | 60 | 20 | 100 | — | — | — | — |
| 18 | " | " | " | " | — | " | " | " | " | " | " | — | 100 | — | — | — |
| 19 | " | " | " | " | — | " | " | " | " | " | " | — | — | 100 | — | — |
| 20 | " | " | " | " | — | " | " | " | " | " | " | — | — | — | 100 | — |
| 21 | 0.98 | 0.02 | 0.99 | 0.03 | — | 0.03 | 1.02 | 2.0 | 20 | 60 | 20 | — | — | — | — | 100 |
| 22 | " | " | " | " | — | " | " | " | " | " | " | 20 | 20 | 20 | 20 | 20 |
| 23 | " | " | " | " | — | " | " | " | " | " | " | 40 | 10 | 20 | 10 | 20 |
| 24 | " | " | " | " | — | " | " | — | — | — | — | — | — | — | — | — |
| 25 | " | " | " | " | — | " | " | 0.2 | 15 | 75 | 10 | 30 | 10 | 10 | 30 | 20 |
| 26 | " | " | " | " | — | " | " | 1.0 | " | " | " | " | " | " | " | " |
| 27 | " | " | " | " | — | " | " | 3.0 | " | " | " | " | " | " | " | " |
| 28 | " | " | " | " | — | " | " | 5.0 | " | " | " | " | " | " | " | " |
| 29 | " | " | " | " | — | " | " | 7.0 | " | " | " | " | " | " | " | " |
| 30 | 0.995 | 0.005 | 1.00 | 0.02 | 0.02 | 0.04 | 1.04 | — | — | — | — | — | — | — | — | — |
| 31 | 0.995 | 0.005 | 1.00 | 0.02 | 0.02 | 0.04 | 1.04 | 0.2 | 15 | 40 | 45 | 20 | 20 | 20 | 20 | 20 |
| 32 | " | " | " | " | " | " | " | 1.0 | " | " | " | " | " | " | " | " |
| 33 | " | " | " | " | " | " | " | 3.0 | " | " | " | " | " | " | " | " |
| 34 | " | " | " | " | " | " | " | 5.0 | " | " | " | " | " | " | " | " |
| 35 | " | " | " | " | " | " | " | 7.0 | " | " | " | " | " | " | " | " |
| 36 | 0.96 | 0.04 | 0.98 | 0.01 | 0.04 | 0.05 | 1.03 | — | — | — | — | — | — | — | — | — |
| 37 | " | " | " | " | " | " | " | 0.2 | 30 | 40 | 30 | — | 50 | 50 | — | — |
| 38 | " | " | " | " | " | " | " | 1.0 | " | " | " | — | " | " | — | — |
| 39 | " | " | " | " | " | " | " | 3.0 | " | " | " | — | " | " | — | — |
| 40 | " | " | " | " | " | " | " | 5.0 | " | " | " | — | " | " | — | — |
| 41 | 0.96 | 0.04 | 0.98 | 0.01 | 0.04 | 0.05 | 1.03 | 7.0 | 30 | 40 | 30 | — | 50 | 50 | — | — |
| 42 | 1.00 | — | 0.99 | — | 0.02 | 0.02 | 1.01 | 3.0 | 10 | 50 | 40 | 20 | 20 | 20 | 20 | 20 |
| 43 | 0.995 | 0.005 | " | — | " | " | " | " | " | " | " | " | " | " | " | " |
| 44 | 0.98 | 0.02 | " | — | " | " | " | " | " | " | " | " | " | " | " | " |
| 45 | 0.96 | 0.04 | " | — | " | " | " | " | " | " | " | " | " | " | " | " |
| 46 | 0.95 | 0.05 | " | — | " | " | " | " | " | " | " | " | " | " | " | " |
| 47 | 1.00 | — | 0.98 | 0.04 | 0.01 | 0.05 | 1.03 | 1.0 | 20 | 60 | 20 | — | 100 | — | — | — |
| 48 | 0.995 | 0.005 | " | " | " | " | " | " | " | " | " | — | " | — | — | — |
| 49 | 0.98 | 0.02 | " | " | " | " | " | " | " | " | " | — | " | — | — | — |
| 50 | 0.96 | 0.04 | " | " | " | " | " | " | " | " | " | — | " | — | — | — |
| 51 | 0.95 | 0.05 | 0.98 | 0.04 | 0.01 | 0.05 | 1.03 | 1.0 | 20 | 60 | 20 | — | 100 | — | — | — |
| 52 | 0.98 | 0.02 | 1.00 | — | — | — | 1.00 | 0.5 | 30 | 40 | 30 | — | — | — | 100 | — |
| 53 | " | " | 0.99 | 0.01 | — | 0.01 | " | " | " | " | " | — | — | — | " | — |
| 54 | " | " | 0.99 | — | 0.01 | 0.01 | " | " | " | " | " | — | — | — | " | — |
| 55 | " | " | 0.97 | 0.01 | 0.02 | 0.03 | " | " | " | " | " | — | — | — | " | — |
| 56 | " | " | 0.95 | 0.05 | — | 0.05 | " | " | " | " | " | — | — | — | " | — |
| 57 | " | " | 0.95 | — | 0.05 | 0.05 | " | " | " | " | " | — | — | — | " | — |
| 58 | " | " | 0.93 | 0.07 | — | 0.07 | " | " | " | " | " | — | — | — | " | — |
| 59 | " | " | 0.93 | — | 0.07 | 0.07 | " | " | " | " | " | — | — | — | " | — |
| 60 | 0.97 | 0.03 | 1.05 | — | — | — | 1.05 | 3.0 | 35 | 55 | 10 | 100 | — | — | — | — |
| 61 | 0.97 | 0.03 | 1.04 | 0.01 | — | 0.01 | 1.05 | 3.0 | 35 | 55 | 10 | 100 | — | — | — | — |
| 62 | " | " | 1.04 | — | 0.01 | 0.01 | " | " | " | " | " | " | — | — | — | — |
| 63 | " | " | 1.02 | 0.02 | 0.01 | 0.03 | " | " | " | " | " | " | — | — | — | — |
| 64 | " | " | 1.00 | 0.03 | 0.02 | 0.05 | " | " | " | " | " | " | — | — | — | — |
| 65 | " | " | 0.98 | 0.05 | 0.02 | 0.07 | " | " | " | " | " | " | — | — | — | — |
| 66 | 0.98 | 0.02 | 0.95 | — | 0.03 | 0.03 | 0.98 | 1.0 | 10 | 50 | 40 | 20 | 20 | 20 | 20 | 20 |
| 67 | " | " | 0.97 | — | " | " | 1.00 | " | " | " | " | " | " | " | " | " |
| 68 | " | " | 1.00 | — | " | " | 1.03 | " | " | " | " | " | " | " | " | " |
| 69 | " | " | 1.02 | — | " | " | 1.05 | " | " | " | " | " | " | " | " | " |
| 70 | " | " | 1.04 | — | " | " | 1.07 | " | " | " | " | " | " | " | " | " |
| 71 | 0.99 | 0.01 | 0.93 | 0.03 | 0.02 | 0.05 | 0.98 | 2.0 | 15 | 75 | 10 | — | — | 100 | — | — |
| 72 | " | " | 0.95 | " | " | " | 1.00 | " | " | " | " | — | — | " | — | — |
| 73 | " | " | 0.98 | " | " | " | 1.03 | " | " | " | " | — | — | " | — | — |
| 74 | " | " | 1.00 | " | " | " | 1.05 | " | " | " | " | — | — | " | — | — |
| 75 | " | " | 1.02 | " | " | " | 1.07 | " | " | " | " | — | — | " | — | — |

According to Table 1, the major ingredient of the dielectric bodies of the capacitors of Test No. 1 was:

$$0.98\{(Ba_{0.99}Ca_{0.03})O_{1.02}TiO_2\} + 0.02CaZrO_3,$$

or, more specifically, since $M_{0.03} = Ca_{0.03}$,

$$0.98\{(Ba_{0.99}Ca_{0.03})O_{1.02}TiO_2\} + 0.02CaZrO_3.$$

One hundred parts by weight of this major ingredient was admixed with 2.0 parts by weight of an additive minute of one mole percent $Li_2O$, 80 mole percent $SiO_2$ and 19 mole percent MO. The MO was a mixture of 20 mole percent BaO, 50 mole percent CaO and 30 mole percent MgO.

For the fabrication of the capacitors of Test No. 1 we started with the preparation of the first component, $(Ba_{0.99}Ca_{0.03})O_{1.02}TiO_2$, of the major ingredient. We prepared the following start materials for the first component of the major ingredient:

Barium carbonate ($BaCO_3$):
  1053.12 grams (0.99 mole part)
Calcium carbonate ($CaCO_3$):

16.19 grams (0.03 mole part)
Titanium oxide ($TiO_2$):
430.70 grams (1.00 mole part)

These start materials had all purities of not less than 99.0 percent. The above specified weights of the start materials did not include those of the impurities contained.

We charged the start materials into a pot mill together with alumina balls and 2.5 liters of water and intimately intermingled them by stirring the pot mill for 15 hours. Then we introduced the mixture into a stainless steel pot and dried it by air heated to 150° C. for four hours. Then we crushed the dried mixture into relatively coarse particles and then fired the particles in air within a tunnel furnace at 1200° C. for two hours. There was thus obtained the first component of the major ingredient in finely divided form.

Then we proceeded to the preparation of the second component, $CaZrO_3$, of the major ingredient of Test No. 1. We intermingled 448.96 grams of calcium carbonate ($CaCo_3$) and 551.04 grams of zirconium oxide ($ZrO_2$). Then we dried and pulverized the mixture and fired the resulting particles in air at 1250° C. for two hours.

Then, in order to obtain the major ingredient of Test No. 1 in the required molar ratio (0.98:0.02) of the first and second components, we intermingled 984.56 grams (98 mole parts) of $(Ba_{0.99}Ca_{0.03})O_{1.02}TiO_2$ and 15.44 grams (two mole parts) of $CaZrO_3$. One thousand grams of the major ingredient was thus obtained in finely divided form.

For the additives of Test No. 1 we first prepared the following substances in the following amounts:
$Li_2O$: 0.44 grams (1.0 mole part)
$SiO_2$: 70.99 grams (80.0 mole parts)
$BaCO_3$: 11.10 grams (3.8 mole parts)
$CsCO_3$: 14.07 grams (9.5 mole parts)
$MgO$: 3.40 grams (5.7 mole parts)

To these substances we added 300 cubic centimeters of alcohol and stirred the resulting slurry for 10 hours in a polyethylene pot with alumna balls. Then we air fired the mixture at 1000° C. for two hours. Then we charged the fired mixture into an alumina pot together with 300 cubic centimeters of water and pulverized it with alumina balls over a period of 15 hours. Then we dried the pulverized mixture at 150° C. for four hours.

Thus we obtained in finely divided form the desired additive mixture of one mole percent $Li_2$), 80 mole percent $SiO_2$ and 19 mole percent MO, with the MO consisting of 3.8 mole percent BaO, 9.5 mole percent CaO and 5.7 mole percent MgO. The relative proportions of BaO, CaO and MgO were 20, 50 and 30 mole percent.

Having thus prepared the major ingredient and additive mixture of Test No. 1, we added 20 grams (two weight parts) of the latter to 1000 grams (100 weight parts) of the former. Further, to this mixture, we added 15 percent by weight of an organic binder and 50 percent by weight of water with respect to the total weight of the major ingredient and additives. The organic binder was an aqueous solution of acrylic ester polymer, glycerine, and condensed phosphate. Then we ball milled the mixture into a slurry and then defoamed it in vacuum.

Then we charged the defoamed slurry into a reverse roll coater and shaped it into a thin, continuous strip on an elongate blacking strip of polyester film. Then we dried the strip by heating it to 100° C. on the backing film. There was thus obtained a green ceramic strip with a thickness of approximately 25 micrometers. We subsequently punched it into "squares" sized 10 by 10 centimeters. These green ceramic squares were to become the ceramic layers 12, FIG. 1, in the completed test capacitors 10.

For the fabrication of the base metal film electrodes 14 on the ceramic layers 12, we prepared 10 grams of nickel in finely divided form, with an average particle size of 1.5 micrometers, and a solution of 0.9 gram of ethyl cellulose in 9.1 grams of butyl "Carbitol" (trademark for diethylene glycol monobutyl ether). We intimately intermingled them in an agitator for 10 hours, thereby providing an electroconductive paste. Then we "printed" the paste on one surface of each green ceramic square, which had been prepared as above stated, through a screen having an array of 50 perforations of rectangular shape, each sized seven by 14 millimeters.

After having allowed the printed paste to dry, we stacked two green squares, with the printings thereon directed upwardly, and with the printings on the two squares offset from each other to an extent approximately half the pitch of the paste pattern in the longitudinal direction. Then we placed the stack of two printed squares between two separate stacks of four unprinted squares each with a thickness of 60 micrometers. Then we exerted a pressure of 40 tons on the resulting stack of printed and unprinted squares in their thickness direction at 50° C., thereby firmly bonding them together. Then we cut the bonded squares in a latticed pattern into 50 laminate chips of identical construction.

We employed a furnace capable of atmosphere control for cofiring the above prepared green dielectric bodies and, buried therein, the conductive layers which were to become the film electrodes 14 in the completed capacitors 10. We first air heated the chips to 600° C. at a rate of 100° C. per hours, thereby driving off the organic binder that had been used for providing the slurry of the powdered major ingredient and additives. Then we changed the furnace atmosphere from air to a reductive (nonoxidative)atmosphere consisting of two percent by volume of molecular hydrogen and 98 percent by volume of molecular nitrogen. Then, in this furnace atmosphere, we raised the furnace temperature from 600° C. to 1150° C. at a rate of 100° C. per hours. We maintained for three hours the maximum furnace temperature of 1150° C., at which the ceramic bodies formulated in accordance with our invention were to be sintered to maturity. Then we lowered the furnace temperature to 600° C. at a rate of 100° C. per hours. Then, with the furnace atmosphere again changed to air (oxidative atmosphere), we maintained the temperature of 600° C. for 30 minutes for the oxidizing heat treatment of the sintered chips. Then we allowed the furnace temperature to drop to room temperature.

Thus we obtained the dielectric ceramic bodies 15 cosintered with the film electrodes 14 buried therein.

We proceeded to the production of the pair of conductive terminations 16 on both sides of each ceramic body 15 at which were exposed the film electrodes 14. First, for the production of the inmost zinc layers 18, we coated both sides of each ceramic body 15 with an electroconductive paste composed of zinc, glass frit and vehicle. Then, after having allowed the coatings to dry, we heated them to 550° C. in air and held the temperature for 15 minutes, thereby completing the zinc layers 18 each in direct contact with one of the two film electrodes 14. Then we formed the intermediate copper layers 20 over the zinc layers 18 by electroless plating, and then the outermost solder layers 22 over the copper layers 20 by electroplating an alloy of lead and tin.

We have thus completed the fabrication of the monolithic, multilayered ceramic test capacitors 10, each constructed as in FIG. 1, in accordance with the ceramic composition of Test No. 1 of Table 1. The composition of the ceramic bodies 15 of the thus completed capacitors 10 proved substantially akin to that before sintering.

As for the other ceramic compositions of Table 1, designated Tests No. 2–75, we made similar capacitors through the same procedure as set forth in the foregoing in connection with the Test No. 1 composition, except for the temperature of sintering in the reductive atmosphere, to which we will presently refer in more detail.

Then we tested all the capacitors of Tests Nos. 1–75 as to their specific dielectric constants, dielectric losses, resistivities, and capacitance-temperature characteristics. We measured these electrical properties of the test capacitors by the following methods:

Specific Dielectric Constant

The capacitance of each test capacitor was first measured at a temperature of 20° C., a frequency of one kilohertz, and an effective voltage of 1.0 volt. Then the specific dielectric constant was computed from the measured value of capacitance, and the area (25 square millimeters) of each of the opposed parts of the film electrodes 14, and the thickness (0.02 millimeter) of that ceramic layer 12 which intervenes between the film electrodes.

Dielectric Loss

The dielectric loss was measured under the same conditions as the specific dielectric constant.

Resistivity

Resistance between the pair of conductive terminations 16 of each test capacitor was measured after the application of a direct voltage of 100 volts for one minute. Then the resistivity was computed from the measured resistance value and the size of each test capacitor.

Temperature Dependence of Capacitance

The test capacitors were introduced into a thermostatic oven, and their capacitances at various preselected temperatures were measured at a frequency of one kilohertz and an effective voltage of 1.0 volt. Then the percent changes of the capacitances at $-55°$ and $+125°$ C. from those at 25° C., and at $-25°$ and $+85°$ C. from those at 20° C., were computed.

Table 2 gives the properties of the test capacitors as measured by the above described methods, as well as the maximum temperatures at which the test capacitors were sintered in the reductive atmosphere during their manufacture.

TABLE 2

| | Firing Temperature & Capacitor Characteristics | | | | | | | |
|---|---|---|---|---|---|---|---|---|
| | | Capacitor Characteristics | | | | | | |
| Test No. | Firing Temp. (°C.) | Specific Dielectric Constant | Dielectric Loss (%) | Resistivity (megohm-cm) | Capacitance Variations (%) | | | |
| | | | | | At $-55°$ C. | At 125° C. | At $-25°$ C. | At 85° C. |
| 1 | 1150 | 3560 | 1.1 | $3.0 \times 10^6$ | $-11.2$ | $+6.1$ | $-6.7$ | $-4.8$ |
| 2 | 1150 | 3610 | 1.1 | $3.3 \times 10^6$ | $-10.3$ | $+2.2$ | $-5.8$ | $-5.7$ |
| 3 | 1140 | 3620 | 1.2 | $2.8 \times 10^6$ | $-11.7$ | $+5.1$ | $-7.3$ | $-5.0$ |
| 4 | 1130 | 3580 | 1.1 | $2.6 \times 10^6$ | $-12.3$ | $+6.3$ | $-8.4$ | $-4.2$ |
| 5 | 1140 | 3530 | 1.3 | $2.3 \times 10^6$ | $-11.4$ | $+7.1$ | $-6.3$ | $-2.6$ |
| 6 | 1140 | 3600 | 1.2 | $2.7 \times 10^6$ | $-11.0$ | $+4.6$ | $-6.0$ | $-3.5$ |
| 7 | 1130 | 3640 | 1.2 | $2.9 \times 10^6$ | $-11.6$ | $+4.2$ | $-6.5$ | $-5.3$ |
| 8 | 1140 | 3550 | 1.2 | $2.2 \times 10^6$ | $-11.2$ | $+5.7$ | $-6.3$ | $-5.6$ |
| 9 | 1130 | 3530 | 1.2 | $2.4 \times 10^6$ | $-12.0$ | $+7.1$ | $-7.2$ | $-3.0$ |
| 10 | 1150 | 3490 | 1.2 | $2.6 \times 10^6$ | $-11.2$ | $+5.3$ | $-6.6$ | $-5.2$ |
| 11 | 1250 | Not coherently bonded on firing | | | | | | |
| 12 | " | Not coherently bonded on firing | | | | | | |
| 13 | " | Not coherently bonded on firing | | | | | | |
| 14 | " | Not coherently bonded on firing | | | | | | |
| 15 | " | Not coherently bonded on firing | | | | | | |
| 16 | " | Not coherently bonded on firing | | | | | | |
| 17 | 1140 | 3670 | 1.0 | $3.1 \times 10^6$ | $-12.1$ | $+6.8$ | $-7.0$ | $-3.4$ |
| 18 | 1130 | 3480 | 1.1 | $3.0 \times 10^6$ | $-10.7$ | $+5.1$ | $-6.9$ | $-4.1$ |
| 19 | 1130 | 3650 | 1.1 | $2.8 \times 10^6$ | $-12.2$ | $+6.3$ | $-7.8$ | $-4.8$ |
| 20 | 1140 | 3630 | 1.0 | $2.8 \times 10^6$ | $-12.4$ | $+6.2$ | $-8.1$ | $-4.2$ |
| 21 | 1140 | 3680 | 1.2 | $2.5 \times 10^6$ | $-11.8$ | $+5.1$ | $-7.2$ | $-4.3$ |
| 22 | 1140 | 3560 | 1.2 | $3.1 \times 10^6$ | $-12.0$ | $+6.1$ | $-7.5$ | $-4.6$ |
| 23 | 1140 | 3620 | 1.0 | $3.3 \times 10^6$ | $-12.0$ | $+6.0$ | $-7.0$ | $-4.7$ |
| 24 | 1250 | Not coherently bonded on firing | | | | | | |
| 25 | 1190 | 4040 | 1.6 | $1.3 \times 10^6$ | $-11.9$ | $+3.1$ | $-7.5$ | $-5.0$ |
| 26 | 1170 | 3840 | 1.2 | $1.7 \times 10^6$ | $-12.3$ | $+3.6$ | $-7.8$ | $-4.2$ |
| 27 | 1120 | 3260 | 1.0 | $2.6 \times 10^6$ | $-13.0$ | $+2.1$ | $-8.4$ | $-6.5$ |
| 28 | 1090 | 3080 | 1.5 | $1.9 \times 10^6$ | $-14.0$ | $+0.3$ | $-8.8$ | $-7.8$ |
| 29 | 1060 | 2690 | 1.7 | $1.5 \times 10^6$ | $-18.3$ | $-4.1$ | $-10.6$ | $-10.5$ |
| 30 | 1250 | Not coherently bonded on firing | | | | | | |
| 31 | 1180 | 4050 | 1.2 | $1.8 \times 10^6$ | $-13.1$ | $+6.3$ | $-8.9$ | $-2.7$ |
| 32 | 1160 | 3860 | 1.0 | $2.9 \times 10^6$ | $-13.0$ | $+7.0$ | $-9.1$ | $-2.2$ |
| 33 | 1140 | 3450 | 1.2 | $3.0 \times 10^6$ | $-13.8$ | $+6.1$ | $-8.5$ | $-2.6$ |
| 34 | 1100 | 3060 | 1.5 | $2.6 \times 10^6$ | $-14.2$ | $+3.3$ | $-8.8$ | $-5.3$ |
| 35 | 1080 | 2810 | 1.7 | $2.6 \times 10^6$ | $-20.3$ | $-2.1$ | $-11.0$ | $-6.2$ |
| 36 | 1250 | Not coherently bonded on firing | | | | | | |
| 37 | 1160 | 4520 | 1.7 | $1.8 \times 10^6$ | $-5.3$ | $-7.2$ | $-2.8$ | $-8.8$ |
| 38 | 1150 | 3970 | 1.0 | $3.0 \times 10^6$ | $-5.0$ | $-7.3$ | $-9.1$ | $-9.2$ |
| 39 | 1100 | 3660 | 1.0 | $2.8 \times 10^6$ | $-6.1$ | $-8.4$ | $-3.0$ | $-9.2$ |
| 40 | 1070 | 3220 | 1.4 | $2.2 \times 10^6$ | $-7.3$ | $-11.3$ | $-3.5$ | $-9.6$ |

TABLE 2-continued

Firing Temperature & Capacitor Characteristics

| Test No. | Firing Temp. (°C.) | Specific Dielectric Constant | Dielectric Loss (%) | Resistivity (megohm-cm) | Capacitance Variations (%) | | | |
|---|---|---|---|---|---|---|---|---|
| | | | | | At −55° C. | At 125° C. | At −25° C. | At 85° C. |
| 41 | 1040 | 2900 | 1.6 | $2.2 \times 10^6$ | −10.6 | −13.0 | −6.6 | −11.0 |
| 42 | 1130 | 3440 | 1.1 | $3.0 \times 10^6$ | −20.6 | +11.6 | −13.3 | +5.3 |
| 43 | 1100 | 3530 | 1.2 | $3.0 \times 10^6$ | −14.0 | +6.1 | −9.2 | −1.7 |
| 44 | " | 3600 | 1.0 | $2.8 \times 10^6$ | −12.3 | +3.1 | −7.5 | −5.1 |
| 45 | " | 3660 | 1.1 | $3.1 \times 10^6$ | −6.7 | −1.8 | −3.0 | −9.0 |
| 46 | " | 3590 | 1.1 | $3.3 \times 10^6$ | +1.2 | −8.1 | +0.1 | −13.1 |
| 47 | 1180 | 3650 | 1.1 | $3.5 \times 10^6$ | −18.3 | +8.6 | −11.6 | +5.1 |
| 48 | 1160 | 3820 | 1.0 | $3.8 \times 10^6$ | −14.0 | +4.2 | −9.3 | −1.8 |
| 49 | 1160 | 3730 | 1.1 | $4.0 \times 10^6$ | −9.2 | −1.0 | −3.4 | −4.7 |
| 50 | 1160 | 3810 | 1.2 | $3.5 \times 10^6$ | −3.8 | −5.6 | −1.9 | −7.9 |
| 51 | 1160 | 3840 | 1.1 | $3.3 \times 10^6$ | −0.3 | −10.6 | −0.2 | −11.5 |
| 52 | 1160 | 3670 | 1.7 | $1.6 \times 10^6$ | −17.1 | +7.2 | −11.5 | +3.8 |
| 53 | 1150 | 3880 | 1.2 | $3.0 \times 10^6$ | −13.5 | +9.1 | −8.5 | +1.6 |
| 54 | 1150 | 3880 | 1.1 | $2.5 \times 10^6$ | −12.6 | +8.8 | −7.4 | −0.6 |
| 55 | 1160 | 3630 | 1.0 | $2.4 \times 10^6$ | −11.8 | +6.3 | −6.5 | −4.2 |
| 56 | 1180 | 3530 | 1.1 | $3.3 \times 10^6$ | −11.2 | +4.2 | −5.7 | −8.3 |
| 57 | 1180 | 3610 | 1.1 | $3.5 \times 10^6$ | −10.0 | +2.1 | −5.3 | −8.8 |
| 58 | 1180 | 3660 | 1.0 | $3.5 \times 10^6$ | −10.3 | −3.1 | −5.0 | −11.2 |
| 59 | 1180 | 3730 | 1.0 | $3.3 \times 10^6$ | −9.2 | −4.6 | −4.7 | −11.5 |
| 60 | 1140 | 3670 | 1.8 | $1.3 \times 10^6$ | −17.3 | +12.6 | −11.9 | +6.3 |
| 61 | 1130 | 3380 | 1.2 | $1.8 \times 10^6$ | −13.1 | +7.5 | −9.4 | +3.1 |
| 62 | 1130 | 3540 | 1.2 | $1.8 \times 10^6$ | −12.8 | +5.1 | −9.0 | +3.6 |
| 63 | 1150 | 3550 | 1.1 | $2.0 \times 10^6$ | −8.6 | +3.0 | −4.2 | −5.1 |
| 64 | 1150 | 3460 | 1.1 | $2.1 \times 10^6$ | −4.1 | −2.8 | −1.6 | −9.0 |
| 65 | 1150 | 3530 | 1.1 | $2.1 \times 10^6$ | −2.6 | −4.1 | −1.0 | −11.0 |
| 66 | 1120 | 3080 | 2.4 | $6.2 \times 10^4$ | −22.0 | −10.3 | −14.0 | −7.4 |
| 67 | 1140 | 3530 | 1.2 | $2.5 \times 10^6$ | −13.0 | +5.8 | −8.0 | −6.2 |
| 68 | 1160 | 3550 | 1.0 | $2.8 \times 10^6$ | −11.2 | +4.0 | −7.0 | −4.5 |
| 69 | 1180 | 3380 | 1.0 | $2.9 \times 10^6$ | −10.5 | +1.5 | −5.3 | −7.6 |
| 70 | 1250 | Not coherently bonded on firing | | | | | | |
| 71 | 1120 | 3040 | 3.3 | $5.0 \times 10^4$ | −22.5 | −11.1 | −15.8 | −11.3 |
| 72 | 1130 | 3470 | 1.1 | $2.6 \times 10^6$ | −13.7 | +6.2 | −8.5 | −4.4 |
| 73 | 1150 | 3430 | 1.2 | $3.0 \times 10^6$ | −11.0 | +3.0 | −7.0 | −5.5 |
| 74 | 1180 | 3290 | 1.1 | $3.0 \times 10^6$ | −10.3 | +1.0 | −6.6 | −7.1 |
| 75 | 1250 | Not coherently bonded on firing | | | | | | |

It will be noted from Table 2 that the specific dielectric constants of the Test No. 1 capacitors, for instance, averaged 3560, their dielectric losses 1.1 percent, their resistivities $3.0 \times 10^6$ megohm-centimeters, and their percent variations of capacitances from those at 25° C. to those at −55° and +125° C., −11.2 and +6.1 percent, and from those at 20° C. to those at −25° and +85° C., −6.7 and −4.8 percent, respectively.

Before proceeding further with the examination of Table 2, we will determine the criteria of acceptability for the four electrical properties in question of the capacitors as follows:
Specific dielectric constant, at least 3000.
Dielectric loss, not more than 2.5 percent.
Resistivity, at least $1 \times 10^6$ megohm-centimeters.
Temperature dependence of capacitance, within plus and minus 15 percent at −55° and +125° C., and within plus and minus 10 percent at −25° and +85° C.

A reconsideration of Table 2 in light of the above established criteria of favorable capacitor characteristics will reveal that the capacitors of Test Nos. 11-16, 24, 29, 30, 35, 36, 41, 42, 46, 47, 51, 52, 58, 59, 60, 65, 66, 70, 71 and 75 do not meet these criteria. Accordingly, the corresponding ceramic compositions of Table 1 fall outside the scope of our invention. All the other test capacitors come up to these criteria even though they were sintered at temperatures of less than 1200° in a reductive atmosphere.

Although Table 2 gives the percent variations of capacitances only at −55°, +125°, −25° and +85° C., we actually measured the capacitances at additional temperatures of 0°, +20°, +25°, +40°, +60° and +105° C. The capacitance variations of all the test capacitors in accordance with our invention were within plus and minus 10 percent in the temperature range of −25° to +85° C. and within plus and minus 15 percent in the temperature range of −55° to +125° C.

Now, let us study the ceramic compositions of Table 1 and the corresponding capacitor characteristics of Table 2 in more detail. The ceramic compositions of Tests Nos. 24, 30 and 36 contained no additive specified by our invention. The dielectric bodies formulated accordingly were not coherently bonded on firing at a temperature as high as 1250° C. Consider the ceramic compositions of Tests Nos. 25, 31 and 37 for comparison. They contained 0.2 par by weight of the additives with respect to 100 parts by weight of the major ingredient. Even though the firing temperatures for these test capacitors were as low as from 1160° to 1190° C., they possessed the desired electrical characteristics. We set, therefore, the lower limit of the possible proportions of the additives at 0.2 part by weight with respect to 100 parts by weight of the major ingredient.

The Test Nos. 29, 35 and 41 ceramic compositions contained as much as seven parts by weight of the additives with respect to 100 parts by weight of the major ingredient. The specific dielectric constants of the resulting capacitors are less than the above established criterion of 3000. Also, their capacitance variations were outside the range of plus and minus 10 percent at −25° or +85° C. or outside the range of plus and minus 15 percent at −55° or +125° C. However, when the proportion of the additives was reduced to five parts by weight as in Tests Nos. 28, 24 and 40, the resulting capacitors had all the desired electrical characteristics. Accordingly, the upper limit of the possible proportions of the additives is set at five parts by weight with respect go 100 parts by weight of the major ingredient.

As for the major ingredient, $(1-\alpha)\{(Ba_{k-x}M_x)O_kTiO_2\}+\alpha CaZrO_3$, we tested various values for $\alpha$, k and x in order to determine desirable ranges of such values. First of all, the value of x was set at zero in Tests Nos. 52 and 60. In the resulting capacitors the capacitance variation at $-25°$ C. was outside the desired range of plus and minus 10 percent, and the capacitance variation at $-55°$ C. was also outside the desired range of plus and minus 15 percent. However, all the desired electrical characteristics were obtained when the value of x was set at 0.01 as in Tests Nos. 53, 54, 61 and 62. Thus we set the lowest possible value of x at 0.01.

The Tests Nos. 58, 59 and 65 compositions had the value of x set at 0.07. The capacitance variations of the resulting capacitors at $+85°$ C. fell outside the desired range of plus and minus 10 percent. All the desired electrical characteristics were obtained when the value of x was set at 0.05 as in Tests Nos. 56, 57 and 64. The highest possible value of x is therefore 0.05.

The capital M in the formula of the major ingredient represents either or both of Mg and Zn as aforesaid. The Tests indicate that the use of either or both of Mg and Zn does not substantially affect the characteristics of the resulting capacitors, and that the value of x can be in the range of 0.01 to 0.05 in either case.

The value of $\alpha$ in the formula of the major ingredient was set at zero in Tests Nos. 42 and 47. The capacitance variations of the resulting capacitors fell outside the desired ranges at both $-25°$ C. and $-55°$ C. All the desired characteristics were met when the value of $\alpha$ was set at 0.005 as in Tests Nos. 43 and 48. The lowest possible value of $\alpha$ is therefore 0.005.

The value 0.05 chosen for $\alpha$ in Tests Nos. 46 and 51 was too high because the capacitance variations of the resulting capacitors at 85° C. fell outside the desired range of plus and minus 10 percent. All the desired characteristics were achieved when the value of $\alpha$ was set at 0.04 as in Tests Nos. 45 and 50. The highest possible value of $\alpha$ is therefore 0.04.

When the value of k was set at 0.98 as in Tests Nos. 66 and 71, the resistivities of the resulting capacitors were both less than $1 \times 10^6$ megohm-centimeters. The capacitor characteristics were all satisfactory when the value of k was set at 1.00 as in Tests Nos. 67 and 72. The lowest possible value of k is therefore 1.00.

When the value of k was set at 1.07 as in Tests Nos. 70 and 75, the resulting dielectric bodes were not coherently bonded on firing. Coherently bonded ceramic bodies were obtained, and the capacitor characteristics were all satisfactory, when the value of k was set at 1.05 as in Tests Nos. 69 and 74. The upper limit of the possible values of k is therefore 1.05.

Figure 2:
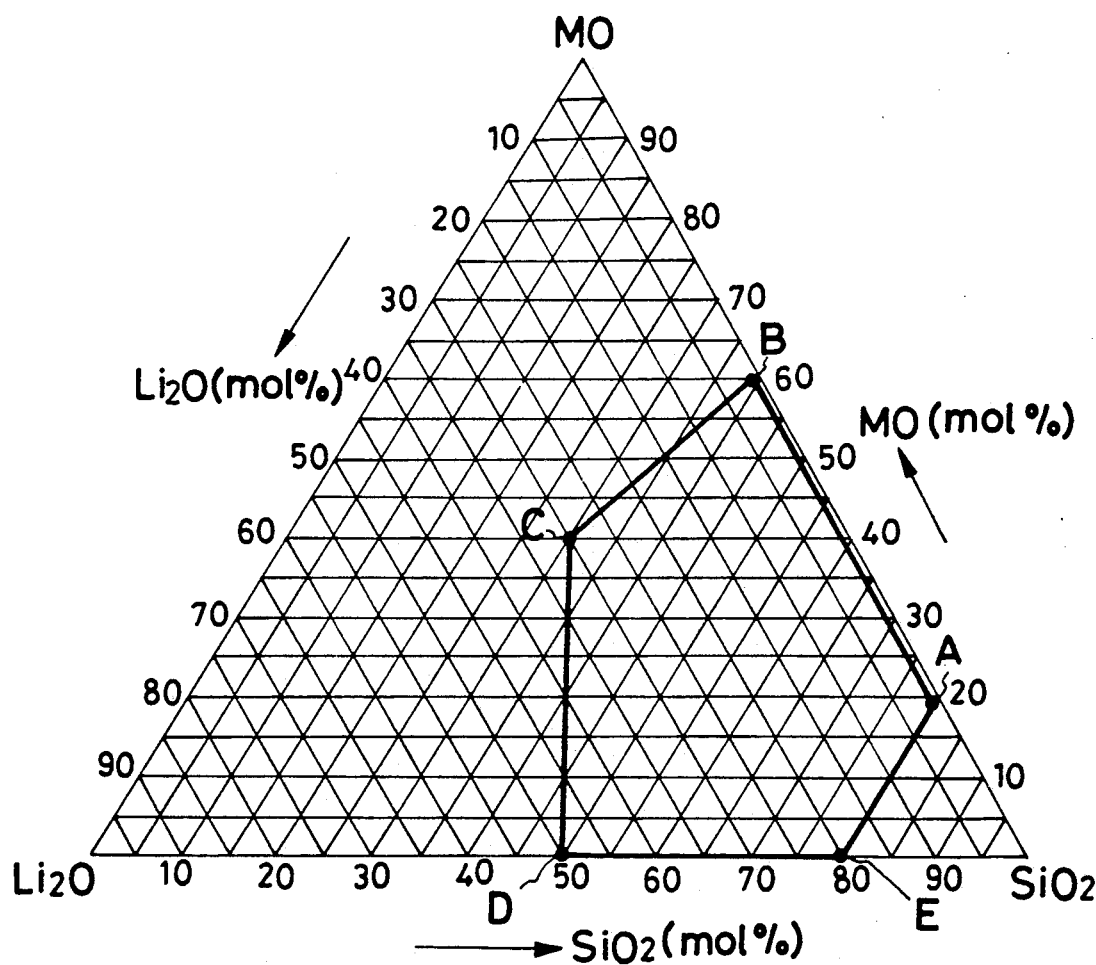
FIG. 2 is a ternary diagram depicting the relative proportions of the additives of the ceramic compositions in accordance with our invention.

We have ascertained from the results of Table 2 that the acceptable range of the relative proportions of $Li_2O$), $SiO_2$ and MO, the additives of the ceramic compositions in accordance with our invention, can be definitely stated in reference to the ternary diagram of FIG. 2. The point A in the ternary diagram indicates the Test No. 1 additive composition of one mole percent $Li_2O$, 80 mole percent $SiO_2$, and 19 mole percent MO. The point B indicates the Test No. 2 additive composition of one mole percent $Li_2O$, 39 mole percent $SiO_2$, and 60 mole percent MO. The point C indicates the Test No. 3 additive composition of 30 mole percent $Li_2O$, 30 mole percent $SiO_2$, and 40 mole percent MO. The point D indicates the Test No. 4 additive composition of 50 mole percent $Li_2O$, 50 mole percent $SiO_2$, and 0 mole percent MO. The point E indicates the Test No. 5 additive composition of 20 mole percent $Li_2O$, 80 mole percent $SiO_2$, and 0 mole percent MO.

The relative proportions of the additives $Li_2O$, $SiO_2$ and MO of the ceramic compositions in accordance with out invention are within the region bounded by the lines sequentially connecting the above defined points A, B, C, D and E in the ternary diagram of FIG. 2.

Tables 1 and 2 prove that the additive compositions within the above defined region makes possible the provision of capacitors of the desired characteristics. The additive compositions of Tests Nos. 11–16 all fall outside that region, and the corresponding dielectric bodies were not coherently bonded on firing at a temperature of as high as 1250° C. The above specified acceptable range of the relative proportions of the additives holds true regardless of whether only one of BaO, MgO, ZnO, SrO and CaO is employed ad MO, as in tests Nos. 17–21, or two or more or all of them are employed as in the other Tests.

Although we have disclosed our invention in terms of specific Examples thereof, we understand that our invention is not to be limited by the exact details of such disclosure but admits of a variety of modifications or alterations within the usual knowledge of the ceramists, chemists or electricians without departing from the scope of the invention. The following, then, is a brief list of such possible modifications or alterations:

1. The low temperature sinterable ceramic compositions of our invention may contain various additives other than those disclosed herein. An example is a mineralizer such as manganese dioxide. Used in a proportion (preferably from 0.05 to 0.10 percent by weight) not adversely affecting the desired characteristics of the resulting capacitors, the mineralizer will serve to improve the sinterability of the ceramic compositions.

2. The start materials of the ceramic compositions in accordance with our invention may be substances such as oxides or hydroxides other than those employed in the foregoing Examples.

3. The temperature of the oxidizing heat treatment need not necessarily be 600° C. but can be variously determined in a range (from 500° to 1000° C. for the best results) not exceeding the temperature of the preceding sintering in a nonoxidative atmosphere, the oxidizing temperature being dependent upon factors such as the particular base metal electrode material in use and the degree of oxidation required for each ceramic material to be produced.

4. The temperature of cosintering in a nonoxidative atmosphere may also be changed in consideration of the particular electrode material in use. We recommend a range of 1050° to 1200° C. if the electrode material is nickel, as we have ascertained by experiment that little or no flocculation of the nickel particles takes place in that temperature range.

5. The dielectric bodies formulated in accordance with our invention, with or without electrodes buried therein or otherwise attached thereto, may be sintered in a neutral, instead of reductive, atmosphere.

6. The principles of our invention may be applied to capacitors other than those of the monolithic, multilayered configuration disclosed herein.

What we claim is:

1. A solid dielectric capacitor comprising a dielectric ceramic body and at least two electrodes in contact therewith, the dielectric ceramic body consisting essentially of:
   (a) 100 parts by weight of a major ingredient expressed by the formula, $$(1-\alpha)\{Ba_{k-x}M_x)O_kTiO_2\} + \alpha CaZrO_3,$$

where
   M is at least either of calcium and strontium;
   $\alpha$ is a numeral in the range of 0.005 to 0.040;
   k is a numeral in the range of 1.00 to 1.05; and
   x is a numeral in the range of 0.01 to 0.05; and
   (b) from 0.2 to 5.0 parts by weight of an additive mixture of lithium oxide, silicon dioxide and at least one metal oxide selected from the group consisting of barium oxide, strontium oxide, calcium oxide, magnesium oxide and zinc oxide, the relative proportions of lithium oxide, silicon dioxide and at least one selected metal oxide constituting the additive mixture being in that region of the ternary diagram of FIG. 2 attached hereto which is bounded by lines sequentially connecting:
   the point A where the additive mixture consists of one mole percent lithium oxide, 80 mole percent silicon dioxide, and 19 mole percent metal oxide;
   the point B where the additive mixture consists of one mole percent lithium oxide, 39 mole percent silicon dioxide, and 60 mole percent metal oxide;
   the point C where the additive mixture consists of 30 mole percent lithium oxide, 30 mole percent silicon dioxide, and 40 mole percent metal oxide;
   the point D where the additive mixture consists of 50 mole percent lithium oxide, 50 mole percent silicon dioxide, and 0 mole percent metal oxide; and
   the point E where the additive mixture consists of 20 mole percent lithium oxide, 80 mole percent silicon dioxide, and 0 mole percent metal oxide.

2. The solid dielectric capacitor of claim 1 wherein the electrodes are buried in the dielectric ceramic body.

3. The solid dielectric capacitor of claim 1 wherein the electrodes are of a base metal.

4. The solid dielectric capacitor of claim 3 wherein the base metal is nickel.

5. A process for the manufacture of a solid dielectric capacitor which comprises:
   (a) providing in finely divided form a mixture of:
   100 parts by weight of a major ingredient express by the formula, $$(1-\alpha)\{(Ba_{k-x}M_x)O_kTiO_2\} + \alpha CaZrO_3,$$

where
   M is at least either of calcium and strontium;
   $\alpha$ is a numeral in the range of 0.005 to 0.040;
   k is a numeral in the rang of 1.00 to 1.05; and
   x is a numeral in the range of 0.01 to 0.05; and
   from 0.2 to 5.0 parts by weight of an additive mixture of lithium oxide, silicon dioxide and at least one metal oxide selected from the group consisting of barium oxide, strontium oxide, calcium oxide, magnesium oxide and zinc oxide, the relative proportions of lithium oxide, silicon dioxide and at least one selected metal oxide constituting the additive mixture being in that region of the ternary diagram of FIG. 2 attached hereto which is bounded by lines sequentially connecting:
   the point A where the additive mixture consists of one mole percent lithium oxide, 80 mole percent silicon dioxide, and 19 mole percent metal oxide;
   the point B where the additive mixture consists of one mole percent lithium oxide, 39 mole percent silicon dioxide, and 60 mole percent metal oxide;
   the point C where the additive mixture consists of 30 mole percent lithium oxide, 30 mole percent silicon dioxide, and 40 mole percent metal oxide;
   the point D where the additive mixture consists of 50 mole percent lithium oxide, 50 mole percent silicon dioxide, and 0 mole percent metal oxide; and
   the point E where the additive mixture consists of 20 mole percent lithium oxide, 80 mole percent silicon dioxide, and 0 mole percent metal oxide; and
   (b) molding the mixture into desired shape and size, the molding having at least two electrode portions of an electroconductive material;
   (c) cosintering the molding and the electrode portions to maturity in a nonoxidative atmosphere; and
   (d) reheating the cosintered molding and electrode portions in an oxidative atmosphere.

6. The process of claim 5 wherein the electrode portions are formed on the molding by coating the same with an electroconductive paste composed principally of a base metal.

7. The process of claim 6 wherein the base metal is nickel.

8. The process of claim 5 wherein the molding and the electrode portions are cosintered in a temperature range of 1050° to 1200° C.

9. The process of claim 5 wherein the cosintered molding and electrode portions are reheated in a temperature range of 500° to 1000° C.

* * * * *

UNITED STATES PATENT AND TRADEMARK OFFICE
CERTIFICATE OF CORRECTION

PATENT NO. : 5,006,955
DATED : April 9, 1991
INVENTOR(S) : Hiroshi Kishi, et al It is certified that error appears in the above-identified patent and that said Letters Patent is hereby corrected as shown below:

Col. 5, line 60, in the equation the "$C_a$" should be --$M_o$--.

Col. 10, in Table 2, Test No. 38 under "at -25°C" the "9.1" should be --1.9--.

Col. 12, line 52, "par" should be --part--.

Signed and Sealed this

Sixth Day of April, 1993

*Attest:*

STEPHEN G. KUNIN

*Attesting Officer*   *Acting Commissioner of Patents and Trademarks*